June 26, 1945.    F. W. BURGER    2,379,277
WHEEL
Filed Dec. 19, 1942

Inventor
Frederick W. Burger
By Walter E. Schirmer
Att'y.

Patented June 26, 1945

2,379,277

UNITED STATES PATENT OFFICE 2,379,277

WHEEL

Frederick W. Burger, Niles, Mich., assignor to Clark Equipment Company, Buchanan, Mich., a corporation of Michigan Application December 19, 1942, Serial No. 469,753

11 Claims. (Cl. 301—35)

This invention relates to wheels, and more particularly is concerned with a wheel construction of the split rim type and its mounting upon a wheel spider.

One of the primary objects of the present invention is to provide a mounting arrangement for demountably securing a rim of the split type on a wheel spider, of for providing a mounting of such a rim in a dual wheel construction.

Another object of the present invention is to provide means which will facilitate the demountable assembly of a split type rim upon the spoke ends of a cast metal spider such as a malleable cast spider or steel cast spider. In this connection the present invention is directed toward insuring a wedge tight fit of the rim upon the spider, while maintaining the rim in a plane normal or at right angles to the axis of rotation so that even tire wear will be provided.

Still another object of the present invention is to provide a dual wheel assembly wherein two split type rims are mounted in parallel spaced relation on a single spider in such manner as to be maintained in parallel planes at right angles to the rotation of the spider.

Other objects and advantages of the present invention will appear more fully from the following detailed description which, taken in conjunction with the accompanying drawing, will disclose to those skilled in the art the particular construction and operation of a preferred form of the present invention.

Figure 1:
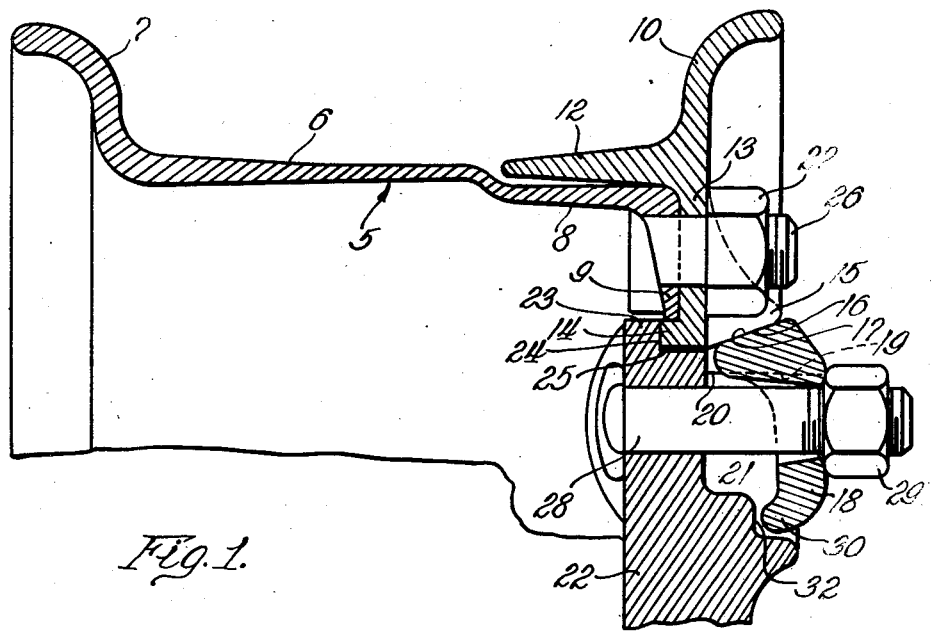
Figure 1 is a sectional view through a spoke end of a cast metal spider showing a rim of the split type demountably secured thereto.

Referring now in more detail to the drawing, in Figure 1, I have provided the rim 5, which comprises the main annular rim portion 6 provided with an integral bead flange 7 and with a slightly reduced annular extension 8 terminating in a radially inwardly directed beveled flange 9.

The other portion of this rim comprises an annular bead flange 10 having the generally cylindrical extension 12 which projects axially over the reduced portion 8 of the rim body 6, and also includes the radially inwardly directed flange portion 13 terminating in an axially inturned lip 14 extending under and closely fitting the inner peripheral surface of the flange 9 of the rim body 6.

The annular bead flange member 10 is provided on its outboard side with an annular boss or projection 15 which has the angularly extending surface 16 forming a seat for receiving the corresponding angular surface 17 of a rim attaching lug 18. The rim attaching lug 18 has the surface 17 arranged on an arc and is provided with shoulders 19 adapted to seat on axially extending walls 20 of a generally U-shaped socket portion 21 formed in the spoke ends of each of the spokes 22 of the cast metal spider. The spokes 22 of the spider terminate at their outer ends in a shoulder portion 23 forming a radial seat 24, and an annular arcuate shoulder 25 for receiving the lip 14 of the bead flange member 10. The two rim portions 6 and 10 are secured together by means of a series of circumferentially spaced bolts 26 which project through the flange 9 and through the flange 13, the boss 15 being interrupted to accommodate these bolts and the two members are tightly clamped together by means of the nuts 27 threaded over the ends of the bolts 26. This clamps the two portions of the rim rigidly together so that the rim can be handled as a unit for mounting and demounting from the wheel spider.

Extending through the socket 21 formed in the outer ends of the spokes 22 is a rim clamping stud 28 having a threaded end adapted to receive the nut 29. This nut engages the outer face of the lug 18, and when tightened, forces the lug 18 inwardly, the lug riding along on its shoulders 19 supported on the walls 20 on the socket. As the lug 18 is moved axially inwardly, the annular surface 17 provides a radially outwardly wedging action on the surface 16, which first moves the lip 14 against the radial shoulder 24 and then tends to chord the rim radially outwardly as the heel portion 30 of the lug moves inwardly toward the shoulder 32. When the heel portion of the lug engages the shoulder 32, the rim is tightly chorded into position on the spoke ends, and due to the fact that the lip 14 engages the radial shoulder 24, the rim will be held in true vertical alinement in a plane at right angles to the axis of the wheel. The rocking action produced by the stud 18 after its wedging action has been accomplished provides for chording the rim intermediate the adjacent spoke ends, thereby providing a very tight construction that will eliminate any possibility of loosening of the rim relative to the wheel spider. When it is desired to demount the rim, the nuts 29 are removed allowing removal of the studs 18, and the rim can then be readily removed from the wheel spider. To replace the tire, the nuts 27 are loosened, allowing separation of the two rim sections whereby the tire can be easily removed for repair and replacement.

Figure 2:
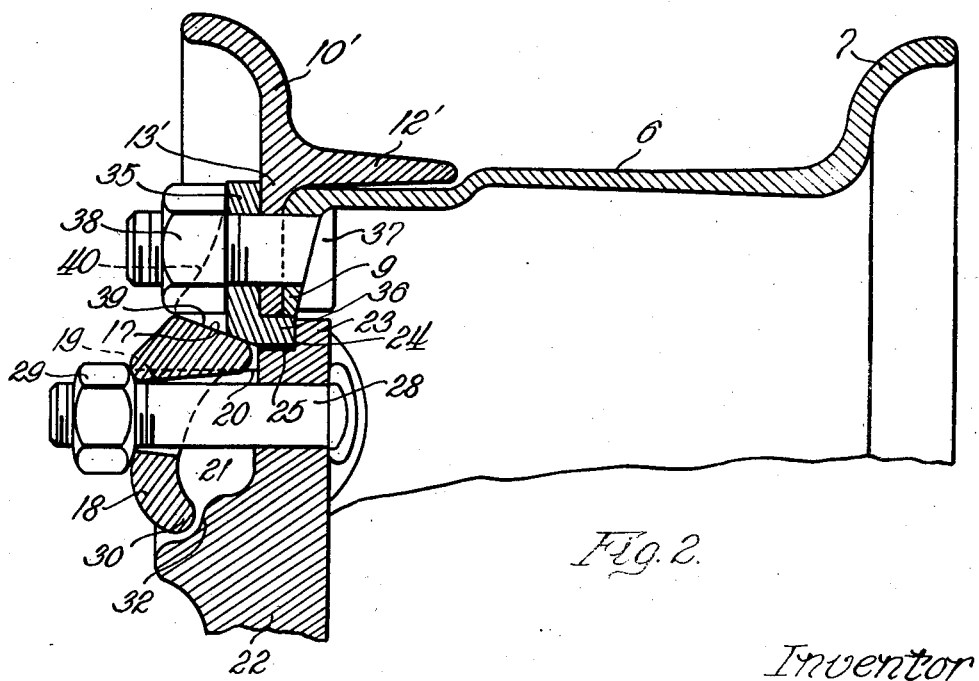
Figure 2 is a corresponding sectional view showing a modified type of split rim.

In the form of the invention shown in Figure 2, the construction is substantially the same insofar as wheel spider and lug are concerned, and corresponding reference numerals have been applied thereto. However, in this form of the invention, the rim is of slightly different construction, embodying the first rim member 6 corresponding to the rim member 6 of Figure 1, but the bead flange member 10 in this form of the invention does not have the flange 13' extend radially inwardly of the flange 9, but it extends the same distance to provide the same inner annular peripheral surface as is provided by the flange 9. In this rim construction, a separate ring 35 is provided, which ring has the internal axial flange 36 engaging the inner axial surface of the flanges 13' and 9. This ring 35 abuts against the outer radial face of the flange 13', and the flange portions are rigidly clamped together by means of the studs 37, which receive the nuts 38, securing these parts rigidly together. The ring 35 is provided with the radially and axially outwardly extending seat 39 formed on the undersurface of an annular projection 40 rolled integrally therewith, the boss being interrupted to accommodate the studs 37. The seat 39 is adapted to be engaged by the corresponding surface 17 of the lugs 18 for clamping the rim in position.

It will be apparent that with this construction the rim is mounted upon the spoke end in the same manner as heretofore described, and the operation of the lug is the same in insuring that the rim will be rigidly chorded into position on the spoke ends.

It is therefore believed that I have provided a new and novel construction for mounting split type rims upon wheel spiders.

I do not intend to be limited to the exact details of construction of the rims as herein shown and described, but only insofar as defined by the scope and spirit of the appended claims.

I claim:

1. In combination, a split rim comprising a first rim portion having a bead flange at one edge and a radially inturned flange at the other edge, means including a second annular bead flange member having a flange portion abutting against said inturned flange and rigidly secured thereto, and circumferentially spaced outwardly projecting portions on said member having tapered mounting seats on the radial inner surface thereof.

2. In combination, a rim including an axially projecting boss having the radial inner surface thereof tapered upwardly and outwardly, a wheel spider having radially extending spokes provided with axially projecting U-shaped sockets terminating in parallel axially extending seats, a rim mounting lug having wing portions supported on said seats and having an arcuate tapered radially outwardly disposed surface, means for drawing said lugs axially inwardly on said seats to wedge said boss outwardly for chording said rim into position on said spoke ends.

3. In combination, a type rim having a circumferential boss on the outboard surface of said rim provided with a radially and axially outwardly extending mounting seat, a wheel spider having radially extending spokes terminating in a radial shoulder radial inwardly extending flange means on said rim adapted to axially abut said shoulder for limiting axial inward movement of said rim over said spoke ends, and clamping lugs carried by said spoke ends and movable axially thereon to engage said mounting seat for clamping said rim flange means against said shoulder and for chording said rim intermediate said spokes.

4. In combination, a split rim having a first annular rim portion comprising an annular bead flange at one edge and a radially inwardly directed flange at the other edge, a second rim portion comprising an annular bead flange portion having an axially extending flange overlying said other edge of said first rim portion, a radially inwardly directed flange axially abutting the corresponding flange of said first rim portion, and an annular outwardly projecting boss provided with a radially and axially outwardly tapered mounting surface, said boss being interrupted at circumferentially spaced points, and a series of bolts extending axially through said abutting flanges at said points to clamp said rim portions together.

5. The combination of claim 4 wherein said second rim portion has its radially inwardly extending flange provided at its inner periphery with an axially directed annular lip forming a seat for the flange of the first rim portion.

6. In a rim structure, a first annular rim member having a bead flange at one lateral edge thereof and having a radially inturned flange at the opposite edge thereof, a second rim member comprising a bead flange portion, an annular axially extending portion overlying the rim portion of said first rim member, and a radially inwardly extending flange portion abutting axially against the inwardly directed flange of said first rim member, an annular ring having a radial portion abutting against the outside face of said radially inwardly directed flange of said second rim portion and an axially directed lip forming an annular seat for said flanges of said rim portions, and an annular projection on the outboard face of said ring providing a tapered rim mounting seat.

7. In a rim struture, a pair of telescopically arranged rim portions each having a bead flange and forming a channel shaped rim, each portion having a radially inwardly extending flange, said flanges being in axial abutment when said rim portions are arranged in operative position, an annular ring having a radial portion abutting against the outboard flange and having an annular axial lip portion extending within the inner annular periphery of said flanges, an annular projection on the outboard face of said ring having a radially and axially outwardly tapered inner surface forming a rim mounting seat.

8. The structure of claim 7 wherein said projection is interrupted at circumferentially spaced intervals, and bolt means is provided thereat for clamping said ring and rim flanges rigidly together.

9. In combination, a channel-shaped rim having an annular outwardly directed projection disposed on one lateral edge thereof radially inwardly of the associated bead flange, said projection having a radially and axially outwardly tapered inner annular surface, a wheel spider having radially extending spokes, means forming an axial abutment at the outer ends of said spokes limiting inward axial movement of said rim, and lug means carried by said spoke ends engaging said tapered surface for clamping said rim against said abutment and for chording said rim intermediate said spokes.

10. The combination of claim 9 wherein said rim has radially inwardly directed flange means adapted to engage said abutment means on said spoke end.

11. In combination, a channel-shaped tire rim having a radially inwardly directed flange adjacent one edge thereof, an annular projection disposed on the outboard face of said rim axially outwardly of said flange and having a radially and axially outwardly tapered inner annular surface, a wheel spider having radially extending spokes provided at their outer ends with circumferentially arranged radial shoulders forming abutments for said flange, and tapered lug means carried by said spoke ends engaging said tapered surface for wedging said rim flange against said abutments and for chording said rim intermediate said spoke ends.

FREDERICK W. BURGER.